(12) United States Patent
Dukart et al.

(10) Patent No.: US 6,496,784 B1
(45) Date of Patent: Dec. 17, 2002

(54) METHOD FOR COMPENSATING THE OFFSET OF ANGLE SENSORS

(75) Inventors: Anton Dukart, Gerlingen (DE); Franz Jost, Stuttgart (DE)

(73) Assignee: Robert Bosch Gmbh, Stuttgart (DE)

( * ) Notice: Subject to any disclaimer, the term of this patent is extended or adjusted under 35 U.S.C. 154(b) by 0 days.

(21) Appl. No.: 09/744,893

(22) PCT Filed: Jun. 8, 2000

(86) PCT No.: PCT/DE00/01878

§ 371 (c)(1),
(2), (4) Date: Jan. 31, 2001

(87) PCT Pub. No.: WO00/79220

PCT Pub. Date: Dec. 28, 2000

(30) Foreign Application Priority Data

Jun. 22, 1999 (DE) .......................... 199 28 482

(51) Int. Cl.⁷ .............................................. G01C 25/00
(52) U.S. Cl. ........................................ 702/94; 702/95
(58) Field of Search ............................ 73/1.75, 504.01, 73/504.02, 504.17; 33/74 L; 324/202; 356/138, 139.04, 912; 364/565, 571.01; 701/203; 702/35, 85, 87, 92, 94, 95, 104, 108, 127, 150, 151, 152, 153

(56) References Cited

U.S. PATENT DOCUMENTS

| | | | | | |
|---|---|---|---|---|---|
| 4,026,031 | A | * | 5/1977 | Siddall et al. | 33/174 L |
| 5,239,490 | A | * | 8/1993 | Masaki et al. | 364/565 |
| 5,612,906 | A | * | 3/1997 | Gotz | 364/571.01 |
| 6,014,610 | A | * | 1/2000 | Judge et al. | 702/92 |
| 6,304,074 | B1 | * | 10/2001 | Waffenschmidt | 324/202 |
| 6,374,190 | B2 | * | 4/2002 | Schupfner | 702/94 |

FOREIGN PATENT DOCUMENTS

| AT | 397 157 B | 2/1994 |
|---|---|---|
| EP | 0 643 285 A | 3/1995 |

* cited by examiner

Primary Examiner—John S. Hilten
Assistant Examiner—Douglas N Washburn
(74) Attorney, Agent, or Firm—Michael J. Striker

(57) ABSTRACT

A method of calibrating the offset of angle sensors, which determine an angle to be determined on the basis of a sine signal assigned to the angle and a cosine signal assigned to the angle. This method includes determining the sine signal and the cosine signal for at least three different angles to obtain at least three value pairs, each pair containing one sine signal value and one cosine signal value; displaying the at least three value pairs in an at least two-dimensional coordinate system that represents a sine signal-cosine signal plane and determining a point, representing the offset to be calibrated, in the coordinate system with regard to which point the at last three value pairs are located on an arc.

2 Claims, 4 Drawing Sheets

Value Pairs:
Usin(1), Ucos(1)
Usin(2), Ucos(2)
Usin(3), Ucos(3)

METHOD FOR COMPENSATING THE OFFSET OF ANGLE SENSORS

BACKGROUND OF THE INVENTION

The present invention relates to a method for calibrating the offset of angle sensors, which determine an angle to be determined on the basis of a sine signal that can be assigned to the angle and a cosine signal that can be assigned to the angle.

For measuring mechanical angles, measuring methods that are based on the evaluation of sine signals and cosine signals of a sensor are often employed. As examples that can be named in this respect are resolvers in the form of inductive transducers, anisotropic magnetoresistive sensors (AMR sensors), sensors which exploit the giant magnetoresistive effect (GMR sensors), Hall sensors in the form of magnetic angle encoders, and optical or micromechanical transducers.

AMR sensors are used for measuring steering wheel angles, for instance. In such sensors, the angle to be determined is determined via electronic processing of the sine signals and cosine signals of the sensors that can be assigned to the angle to be determined.

The angular precision of such sine-cosine sensors is limited by offset effects. Offset effects can occur especially when the sensors are used at high temperatures. For example, an angle measurement in the motor vehicle engine compartment, where high temperatures typically prevail, leads in the case of conventional angle sensors to offset effects that are not negligible. As a result, the ranges of production variation and operating tolerances for the mechanical, magnetic, optical or micromechanical components of such sensors must be set as low as possible, which increases their production costs.

SUMMARY OF THE INVENTION

The object of the present invention is a method with which the angular precision in angle sensors, especially in angle measurements at high temperatures, can be improved in a simple way without having to make overly stringent demands in terms of operating tolerance ranges.

According to the invention the method for calibrating an offset of an angle sensor, which measures an angle based on a sine signal assigned to the angle and a cosine signal assigned to the angle, comprises the following steps:

a) determining the sine signal and the cosine signal for at least three different angles to obtain at least three sine and cosine value pairs, each pair containing one sine signal value and one cosine signal value;

b) displaying the at least three value pairs in an at least two-dimensional coordinate system that represents a sine signal-cosine signal plane; and c) determining a point, representing the offset to be calibrated, in the coordinate system, in relation to which point the at least three value pairs are located on an arc.

This object is attained by the above-described method according to the invention. By means of the method of the invention, the offset of an angle sensor can be calculated and compensated for in a simple way during operation. Compared with conventional versions, this makes it possible to enhance the angular precision, and in particular satisfactory angle measurements can be made at high temperatures, such as in the engine compartment of motor vehicles, The invention makes it possible to increase the ranges of production variation or operating tolerances for the mechanical, magnetic, optical or micromechanical components of the sensors used.

In an especially preferred feature of the method of the invention, the determination of the offset $O\sin$ of the sine signal is done in accordance with an equation $O\sin = \tfrac{1}{2} \cdot \{[U\cos(1) - U\cos(3)] + [(U\sin(2) - U\sin(1))\cdot(U\sin(2) + U\sin(1))/(U\cos(2) - U\cos(1))] - [(U\sin(3) - U\sin(2))\cdot(U\sin(3) + U\sin(2))/(U\cos(3) - U\cos(2))]\}/\{[(U\sin(2) - U\sin(1))/(U\cos(2) - U\cos(1))] - [(U\sin(3) - U\sin(2))/(U\cos(3) - U\cos(2))]\}$, $O\cos = \tfrac{1}{2} \cdot \{[U\sin(1) - U\sin(3)] + [(U\cos(2) - U\cos(1))\cdot(U\cos(2) + U\cos(1))/(U\sin(2) - U\sin(1))] - [(U\cos(3) - U\cos(2))\cdot(U\cos(3) + U\cos(2))/(U\sin(3) - U\sin(2))]\}/\{[(U\cos(2) - U\cos(1))/(U\sin(2) - U\sin(1))] - [(U\cos(3) - U\cos(2))/(U\sin(3) - U\sin(2))]\}$, and the determination of the offset $O\cos$ of the cosine signal is done in accordance with an equation $O\cos = \tfrac{1}{2} * \{U\sin(1) - U\sin(3) + [((U\cos(2) - U\cos(1)) * (U\cos(2) + U\cos(1))/(U\sin(2) - U\sin(1))] - [(U\cos(3) - U\cos(2)) * (U\cos(3) + U\cos(2))/(U\sin(3) - U\sin(2))]\}$ $\sin(2)]\}/[(U$ $\cos(2)-U\cos(1))/(U$ $\sin(2)-U\sin(1))-(U$ $\cos(3)-U\cos(2))/(U$ $\sin(3)-U\sin(2))]$, in which U sin(i), U cos(i) represent the determined sensor signals for the positions i=1, 2, 3.

The equations given contain merely elementary operations with regard to three pairs of measurement values, each for different angles. Other types of calculation and in particular trigonometric types of calculation are also possible.

BRIEF DESCRIPTION OF THE DRAWINGS

The method according to the invention will now be explained further in conjunction with the accompanying drawing. Shown in this drawing are.

DETAILED DESCRIPTION OF THE INVENTION

Figure 1:
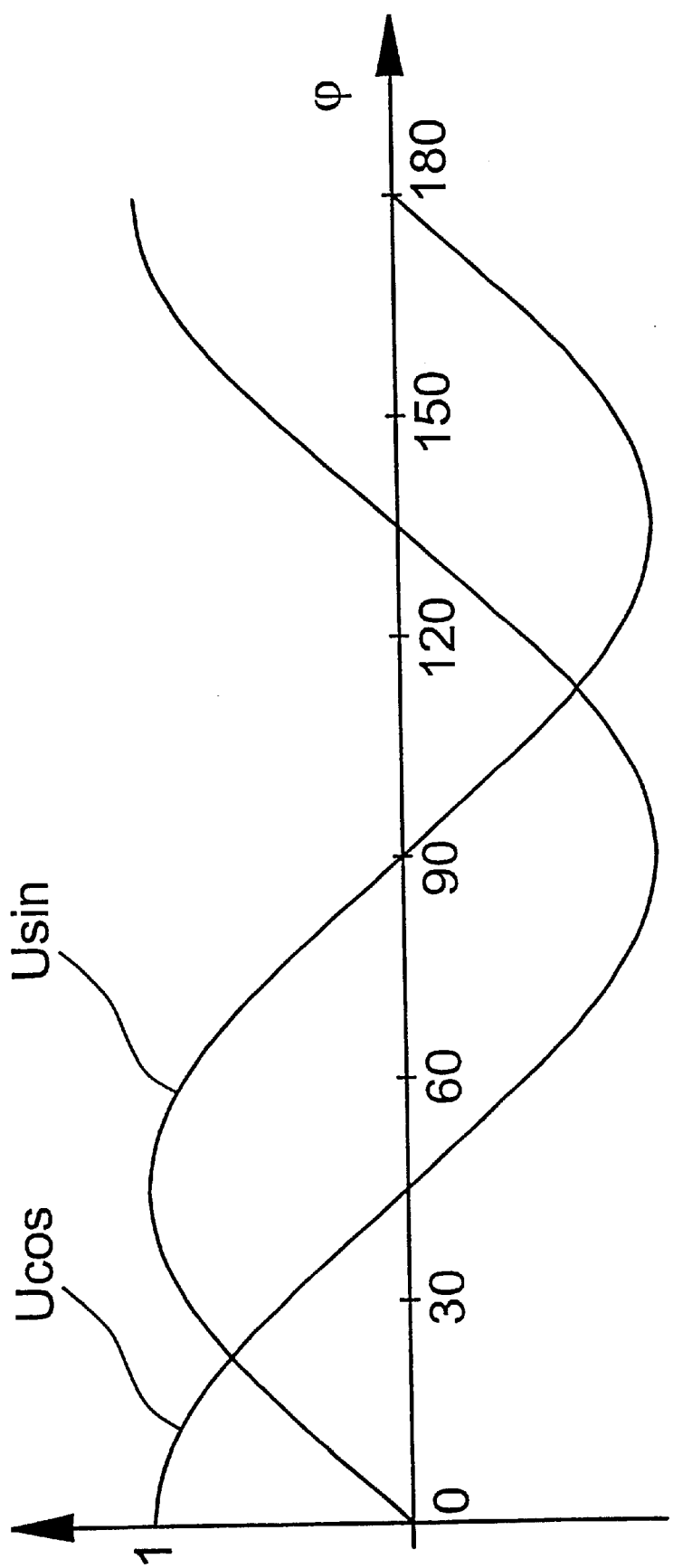
FIG. 1, a graph to schematically illustrate sine signals and cosine signals that can be assigned to an angle.

Numerous angle sensors, for certain angular positions that can for instance be represented in the form of angles between the sensor and a rotatable permanent magnet, generate two different signal values, which correspond to the sine and the cosine, respectively, of the angle to be determined. Such sine and cosine signals are schematically shown in FIG. 1. A cosine signal is represented here by the symbol U cos, and a sine signal is represented by the symbol U sin. It can be seen that at an angle φ of 0°, a signal U sin of 0 and a signal U cos of 1 are present, which corresponds to an ideal sensor without an offset. The signals of such an ideal sensor for angle measurement are U sin (φ)=A*sin (φ), and U cos (φ)=A*cos (φ), in which U sin and U cos are the sensor signals, A is the amplitude of the signal, and φ represents the mechanical angle. On the basis of two such measurement values, the mechanical angle can be calculated, for instance by means of the relationship arctan(U sin (φ)/U cos (φ)).

Figure 2:
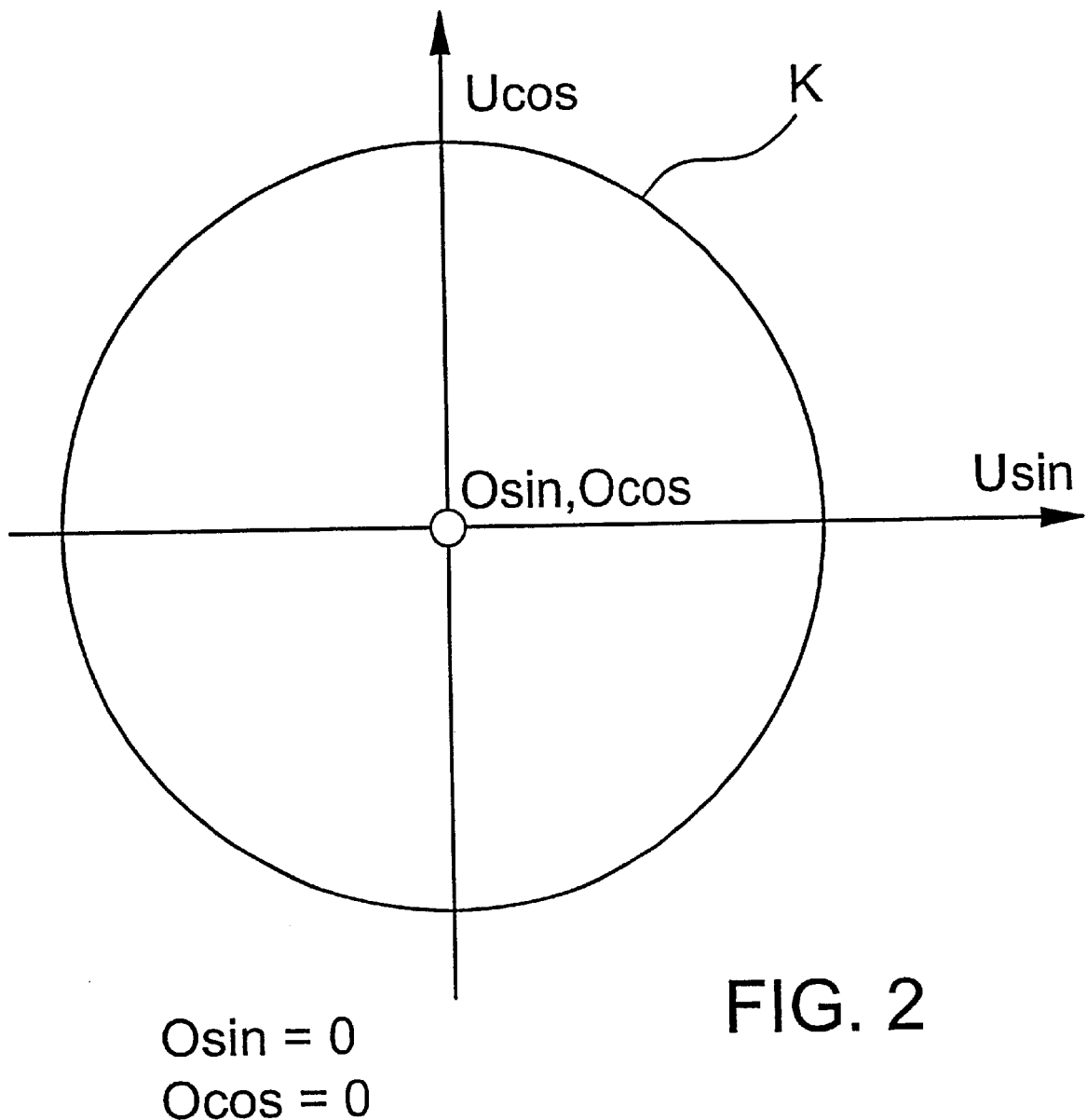
FIG. 2, a graph to illustrate the offset of an ideal sensor.

The ideal state in which no offset in the signals of the angle sensor occurs is shown once again in FIG. 2 in a further graph. Here the signal U sin is plotted on the abscissa, and the signal U cos is plotted on the ordinate. Since the offset values of both signals are equal to 0, that is, O sin=0 and O cos=0, all the value pairs U cos, U sin detected are located on an arc K.

In actual or available angle sensors, however, an offset occurs with regard to both signals, resulting in the following equations:

$U\sin(\phi)=O\sin+A^*\sin(\phi)$, and $U\cos(\phi)=O\cos+A^*\cos(\phi)$.

Figure 3:
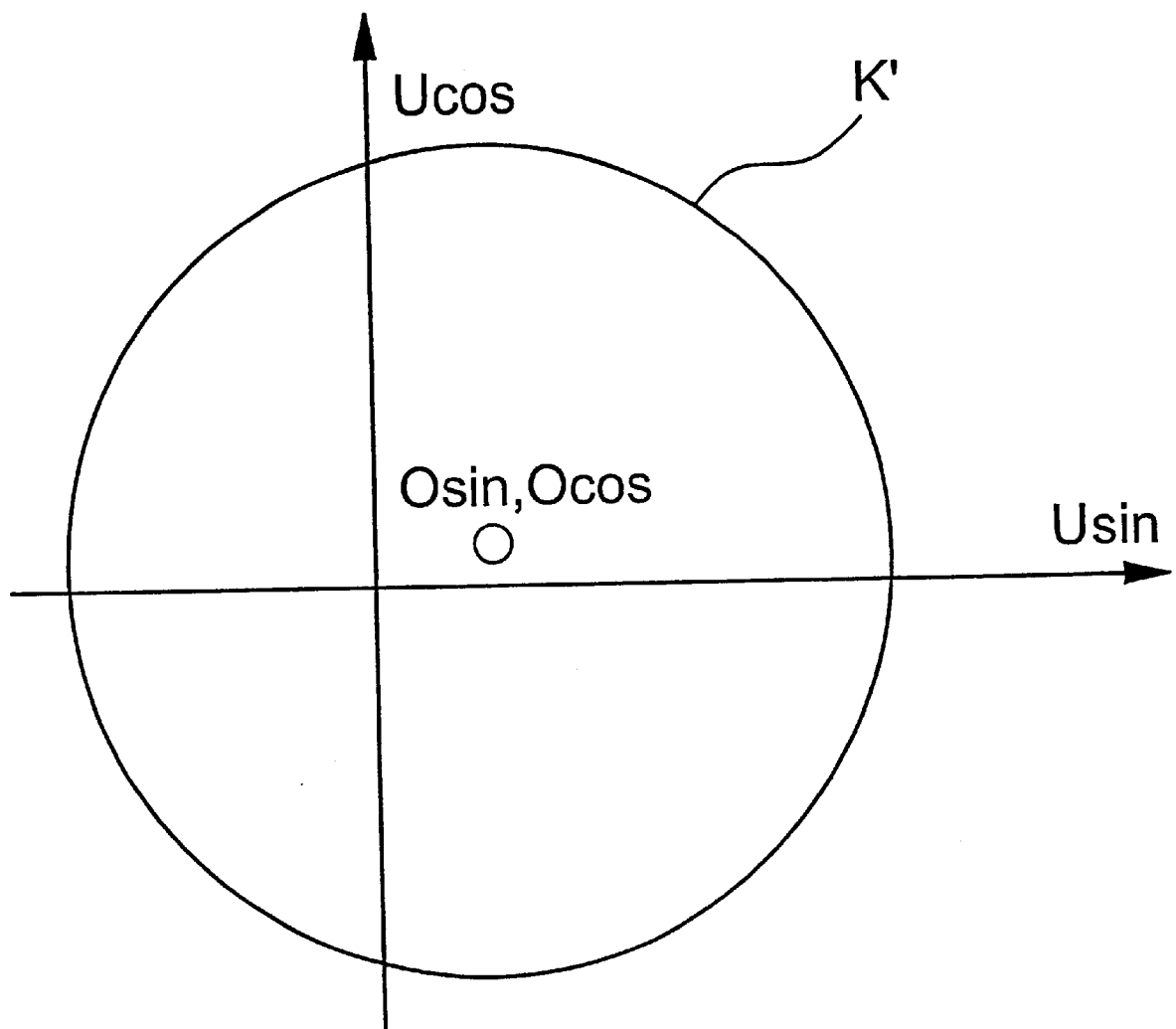
FIG. 3, a graph to illustrate the offset of a real sensor.

The occurrence of such an offset makes angle measurements actually performed incorrect. This real situation is shown in FIG. 3. It can be seen that the offset values O sin and O cos are different from 0. The value pairs obtained when such an offset is present are located on an arc K', which however instead of the ideal zero point has the point (O sin, O cos) as its center point.

The method according to the invention now makes a simple determination of the offset values O sin and O cos possible, so that on the basis of these determined offset values, a cleaned-up angle calculation can be done.

The problem on which the invention is based resides in the determination of the center point of a circle of which only various points along the arc are known.

Figure 4:
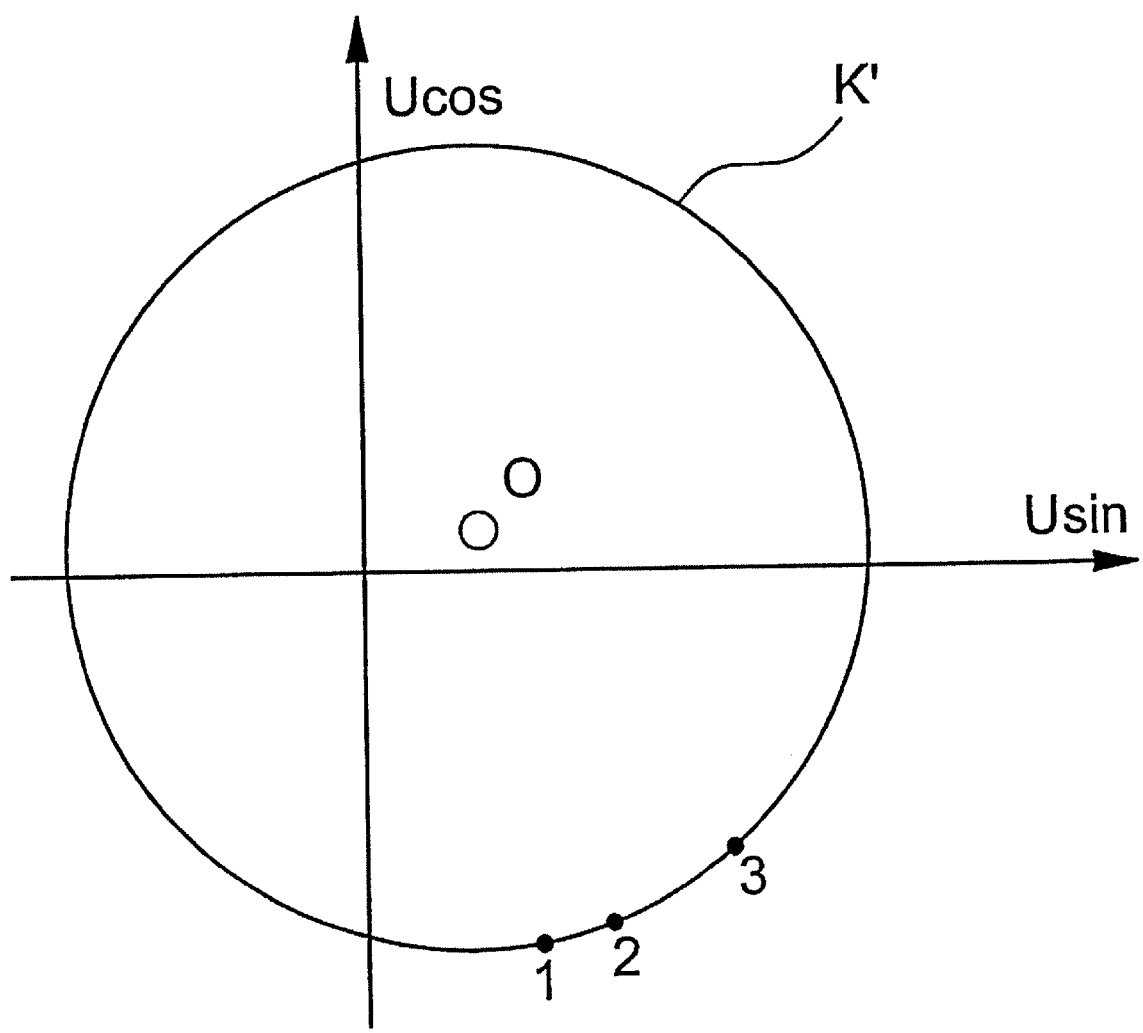
FIG. 4, a graph to illustrate the method of the invention, on the basis of three different angular positions of an angle to be determined.

Solving this problem will now be explained in further detail in conjunction with FIG. 4. In the example shown there, the center point 0 of the circle is determined on the basis of three points 1, 2, 3 that are located on the arc K'. The coordinates of the various points are as follows:

1: U sin(1), U cos(1);

2: U sin(2), U cos(2); and

3: U sin(3), U cos(3).

In other words, in the present example the determination of the center point O of the circle K' is shown on the basis of the three points 1, 2, 3 of the circle. The coordinates of the center point 0 of the circle correspond to the coordinates of the offset, namely O sin, O cos.

Since all three points are located on the circle K', the following conditions apply:

$[O\cos-U\cos(1)]\cdot$ $[O\cos-U\cos(1)]+$ $[O\sin-U\sin(1)]\cdot$ $[O\sin-U\sin(1)]=$ $[O\cos-U\cos(2)]\cdot$ $[O\cos-U\cos(2)]+$ $[O\sin-U\sin(2)]\cdot$ $[O\sin-U\sin(2)]$ and $[O\cos-U\cos(2)]\cdot$ $[O\cos-U\cos(2)]+$ $[O\sin-U\sin(2)]\cdot$ $[O\sin-U\sin(2)]=$ $[O\cos-U\cos(3)]\cdot$ $[O\cos-U\cos(3)]+$ $[O\sin-U\sin(3)]\cdot$ $[O\sin-U\sin(3)]$ Solving these equations yields the following values for the coordinates of the center point of the circle K', or in other words the offset values O sin, O cos:

$O\sin=\frac{1}{2}\cdot\{[U$ $\cos(1)-U\cos(3)]+[(U$ $\sin(2)-U\sin(1))\cdot(U$ $\sin(2)+U\sin(1))/(U$ $\cos(2)-U\cos(1))]-$ $$[(U\sin(3)-U\sin(2))\cdot(U\sin(3)+U\sin(2))/(U\cos(3)-U\cos(2))]\}/\{[(U\sin(2)-U\sin(1))/(U\cos(2)-U\cos(1))]-[(U\sin(3)-U\sin(2))/(U\cos(3)-U\cos(2))]\},$$

$$O\cos=\tfrac{1}{2}\cdot\{[U\sin(1)-U\sin(3)]+[(U\cos(2)-U\cos(1))\cdot(U\cos(2)+U\cos(1))/(U\sin(2)-U\sin(1))]-[(U\cos(3)-U\cos(2))\cdot(U\cos(3)+U\cos(2))/(U\sin(3)-U\sin(2))]\}/\{[(U\cos(2)-U\cos(1))/(U\sin(2)-U\sin(1))]-[(U\cos(3)-U\cos(2))/(U\sin(3)-U\sin(2))]\},$$

$$O\cos=\tfrac{1}{2}*\{U\sin(1)-U\sin(3)+[((U\cos(2)-U\cos(1))*(U\cos(2)+U\cos(1))/(U\sin(2)-U\sin(1))]-[(U\cos(3)-U\cos(2))*(U\cos(3)+U\cos(2)/(U\sin(3)-U\sin(2))]\}/[(U\cos(2)-U\cos(1))/(U\sin(2)-U\sin(1))-(U\cos(3)-U\cos(2))/(U\sin(3)-U\sin(2))].$$

The formulas for representing the offset values O sin, O cos contain·merely elementary operations of the three pairs of measurement values for the various angles. The offset values O sin, O cos can therefore be determined in a simple way on the basis of the calculation method indicated.

It will be noted that the temperature should not vary during the detection of the three measurement value To pairs 1, 2, 3, since the radius of the circle K' is dependent on the temperature, and hence temperature changes can lead to imprecisions.

Mathematical calculation methods known per se for calculating angles on the basis of sine signals and cosine signals can be expanded according to the invention with the automatic offset calibration shown.

The method illustrated permits an automatic offset calibration upon dynamic rotary motions. No change in the actual sensors is made, either in terms of layout, packaging or manufacture. The change takes place only in an evaluation circuit, and thus conventional sensors can continue to be used, given suitable modification of the evaluation circuit. If the evaluation circuit is assigned to a microprocessor, only the software has to be changed, by incorporating the indicated calculation method for calculating the offset and compensating for it. It is understood that hardware expansions of the evaluation electronics are also possible. By means of the method of the invention, new possible uses and new possibilities for diagnosis in safety-relevant systems become available. Examples that can be named in this connection are ESP (electronic stability program) and EPS (electronic power steering) with sensors for measuring steering wheel angles, throttle adjustments, and torque.

The method illustrated can advantageously be used in particular in contactless steering wheel angle measurement and torque measurement, regardless of any measurement or sensor principle employed.

What is claimed is:

1. A method for calibrating an offset of an angle sensor, which determines an angle on the basis of a sine signal assigned to the angle and a cosine signal assigned to the angle, said method having the following steps:
    a) determining the sine signal and the cosine signal for at least three different angles (1,2,3) to obtain at least three sine-cosine value pairs (U sin(1), U cos(1); U sin(2), U cos(2); U sin(3), U cos(3)), each containing one sine signal value and one cosine signal value;
    b) displaying the at least three value pairs in an at least two-dimensional coordinate system that represents a sine signal-cosine signal plane; and
    c) determining a point, representing the offset to be calibrated, in the coordinate system, in relation to which point the at least three value pairs are located on an arc.

2. The method as defined in claim 1, wherein the offset (O sin) of the sine signal is determined in accordance with equation (1) below:

$$O\sin=\tfrac{1}{2}\cdot\{[U\cos(1)-U\cos(3)]+[(U\sin(2)-U\sin(1))\cdot(U\sin(2)+U\sin(1))/(U\cos(2)-U\cos(1))]-[(U\sin(3)-U\sin(2))\cdot(U\sin(3)+U\sin(2))/(U\cos(3)-U\cos(2))]\}/\{[(U\sin(2)-U\sin(1))/(U\cos(2)-U\cos(1))]-[(U\sin(3)-U\sin(2))/(U\cos(3)-U\cos(2))]\} \qquad (I)$$

and the offset (O cos) of the cosine signal is determined in accordance with equation (II) below:

$$O\cos=\tfrac{1}{2}\cdot\{[U\sin(1)-U\sin(3)]+[(U$$

cos(2)−$U$ cos(1))·($U$ cos(2)+$U$ cos(1))/($U$ sin(2)−$U$ sin(1))]−[($U$ cos(3)−$U$ cos(2))·($U$ cos(3)+$U$ cos(2))/($U$ sin(3)−$U$ sin(2))]}/{[($U$ cos(2)−$U$ cos(1))/($U$ sin(2)−$U$ sin(1))]−[($U$ cos(3)−$U$ cos(2))/($U$ sin(3)−$U$ sin(2))]}   (II), wherein U sin(i), U cos(i) represent determined sensor signal values for positions i=1, 2, 3.

* * * * *